United States Patent [19]

Gallagher

[11] Patent Number: 5,748,885
[45] Date of Patent: May 5, 1998

[54] METHOD AND APPARATUS FOR REDUCTION OF I/O OPERATIONS IN PERSISTENT STORAGE SYSTEM

[75] Inventor: Brian Gallagher, Marlboro, Mass.

[73] Assignee: EMC Corporation, Hopkinton, Mass.

[21] Appl. No.: 679,740

[22] Filed: Jul. 15, 1996

Related U.S. Application Data

[63] Continuation of Ser. No. 363,719, Dec. 23, 1994, abandoned.

[51] Int. Cl.$^6$ .................................................. G06F 11/34
[52] U.S. Cl. .............................. 395/185.01; 395/185.02; 371/67.1
[58] Field of Search ............... 395/185.01, 185.02; 371/67.1, 68.1; 365/200

[56] References Cited

U.S. PATENT DOCUMENTS

| | | | |
|---|---|---|---|
| 4,160,240 | 7/1979 | Partipilo | 340/311 |
| 5,289,418 | 2/1994 | Youngerth | 365/201 |
| 5,303,244 | 4/1994 | Watson | 371/10.1 |
| 5,315,602 | 5/1994 | Noya et al. | 371/40.1 |
| 5,341,381 | 8/1994 | Fuller | 371/10.1 |
| 5,375,128 | 12/1994 | Menon et al. | 371/40.1 |
| 5,390,187 | 2/1995 | Stallmo | 371/10.1 |
| 5,390,327 | 2/1995 | Lubbers et al. | 395/575 |
| 5,568,437 | 10/1996 | Jamal | 365/201 |

Primary Examiner—Phung Chung
Attorney, Agent, or Firm—Weingarten, Schurgin, Gagnebin & Hayes LLP

[57] ABSTRACT

A method and apparatus for reducing the number of I/O operations in a persistent storage system. A block of data to be written to a location on a persistent storage device is exclusive OR'd (XOR'd) with the block of data currently stored at the location on the device. The result of the XOR operation is examined for differences between the block of data currently stored in the location and the block of data to be written to the location. If the result of the XOR operation indicates that there is no difference between the block of data currently in the location and the block of data to be written to the location, additional I/O operations are avoided.

16 Claims, 6 Drawing Sheets

Write Data  $D_{new}$
to Data Disk  →◯  (Step 46)

Data Disk Controller

Calculate change parameter $C_p = D_{new} \oplus D_{old}$  (Step 48)

Write data if $C_p \neq 0$

Return $C_p$
to Raid  $C_p$  ←◯  (Step 50)
Controller

Transmit $C_p$  $C_p$
to Parity Controller  →◯  (Step 52)

Parity Disk Controller

If $C_p \neq 0$ Calculate new Parity $P_{new} = P_{old} \oplus C_p$  (Step 54)

If $C_p \neq 0$ write new
Parity to disk

*FIG. 5*

METHOD AND APPARATUS FOR REDUCTION OF I/O OPERATIONS IN PERSISTENT STORAGE SYSTEM

This application is a continuation of application Ser. No. 08/363,719, filed Dec. 23, 1994, now abandoned.

FIELD OF THE INVENTION

The invention relates to the field of data storage devices and more specifically to techniques for reducing the number of I/O operations to a data storage device.

BACKGROUND OF THE INVENTION

Referring to FIG. 1, an implementation of a RAID (Redundant Array of Independent Disks) 4 or 5 type subsystem 10 typically includes a plurality of disk drives 18, 20, 22, 24, 26 in communication with a RAID controller 30 by way of one or more buses 31, 31'. Upon the receipt of a write or read command from a host computer 32, to which the RAID controller 30 is in electrical communication by way of a bus 34 or busses (34, 34'), the RAID controller 30 writes blocks of data to or reads blocks of data from, respectively, the controllers 6, 8, 12, 14 and 16 of disk drives 18, 20, 22, 24, 26. Depending upon the RAID implementation level (4, or 5) the blocks of data and the parity of the blocks of data are distributed among the disks 18, 20, 22, 24, 26 as required by the implemented RAID level specification.

Regardless of which disk 18, 20, 22, 24, 26 actually stores each block of data and which disk 18, 20, 22, 24, 26 actually stores the parity of the blocks of data, the value of the parity is generated by exclusive ORing (XORing) the corresponding data block on each of the disk drives 18, 20, 22, 24, 26. Thus for example if disk drives 18, 20, 22, and 24 are used to store the blocks of data, and if disk drive 26 is used to store the parity of the blocks of data, the parity stored on disk drive 26 would be generated by the expression:

$$P_{26} = DATA_{18} \oplus DATA_{20} \oplus DATA_{22} \oplus DATA_{24}$$

where $P_n$ is the parity stored on the nth disk drive, $DATA_m$ is the block of data stored on the mth disk drive and $\oplus$ is the exclusive OR (XOR) operation. Thus, if one of the disk drives, for example 18, fails so that its data becomes unreadable, each data block that is stored on that disk drive 18 may be recovered from the corresponding data blocks stored on the remaining disk drives 20, 22, 24 and the parity stored on disk drive 26.

Although such a RAID implementation helps assure the integrity of the data stored on the subsystem, disk subsystems in RAID 4 and 5 implementations typically require four disk operations, as illustrated in FIG. 2, when a block of data, $D_{new}$, is written to a disk location. Referring to FIG. 2, when the block of data, $D_{new}$, is to be written to a location on disk, the block of data previously at the location on the disk, $D_{old}$, is read (Step 2). The old parity data, $P_{old}$, for the previously stored blocks of data including $D_{old}$ is read from the disk containing the parity (Step 4). $D_{new}$ and $D_{old}$ are exclusive OR'd to generate a difference pattern which is indicative of the differences between $D_{new}$ and $D_{old}$ and the difference pattern is exclusive ORed with the old parity data, $P_{old}$, to calculate the new parity data, $P_{new}$ (Step 6). Two write operations are required to write both $P_{new}$ and $D_{new}$ to the proper disks (Steps 8 and 10). Thus a total of four disk I/O operations are required to write each new block of data.

It should be noted that although the description above corresponds to FIG. 2 as shown, the order in which $D_{old}$ and $P_{old}$ are read from the data disk and the parity disk, respectively, may be interchanged. Likewise, the order in which $D_{new}$ and $P_{new}$ are written to the data disk and the parity disk, respectively, may also be interchanged. Once the old data, $D_{old}$, has been read from the data disk, the order in which $P_{old}$ is read from the parity disk and $D_{new}$ is written to the data disk may be interchanged. Finally, although the XOR operation has been described in terms of generating a difference pattern from $D_{old}$ and $D_{new}$, the calculation of $P_{new}$ may be accomplished from $D_{old}$, $D_{new}$, and $P_{old}$ without performing this interim step. These changes do not affect either the functionality of the XOR operation or the number of disk I/O operations required to write each new block of data.

If the block of data previously stored on disk, $D_{old}$, is the same as the new data to be written to disk, $D_{new}$, then it is unnecessary to read the old parity data, $P_{old}$, from the disk or to write the new data, $D_{new}$, or the new parity, $P_{new}$, to the disk. Thus three additional I/O operations have occurred which are not necessary. These extra I/O operations are referred to as "the write penalty". As a result of the write penalty, channel bandwidth between the disk drives 18, 20, 22, 24, 26 and the RAID controller 30 is wasted transferring data which is not required; memory is wasted within the RAID controller storing data which is not required; and processing cycles of the RAID controller are wasted as a result of managing the extra I/O operations. Additionally, disk latency penalties are likely to be incurred since the disk may have to undergo at least an additional revolution prior to writing the data to the disk due to the increased time required to receive and process the extra data.

SUMMARY OF THE INVENTION

The invention relates to a method and apparatus for reducing the number of I/O operations by a RAID controller in a persistent storage system. In one embodiment, a RAID controller managing a plurality of persistent storage devices is in electrical communication with a processor executing a user's process. When a block of data is to be written to a predetermined location on a persistent storage device used for storing data, such as a magnetic disk, the block of data is transferred to a RAID controller from the user's processor. The RAID controller then issues a read request to the persistent storage device used for storing data (referred to hereinafter, without loss of generality, as a data disk) to retrieve the data stored at the predetermined location of the data disk. The data disk returns the previously stored data and the RAID controller performs an exclusive OR (XOR) operation between the block of data currently stored at that location on the data disk and the block of data to be written to the data disk to thereby generate a change pattern. If the change pattern is all zeros, no further I/O operation need take place since the previous data and the new data are the same. If the change pattern is non-zero, the RAID controller reads the parity data from the persistent storage device used to store parity data (referred to hereinafter, without any loss of generality, as a parity disk) corresponding to the previously written data and calculates the new parity data corresponding to the new data by XORing the change pattern with the old parity data. The new data is then written to the data disk and the new parity is then written to the parity disk.

In another embodiment, when a write request is issued to the RAID controller by the host computer, the RAID controller writes the data to the data disk controller. The data disk controller then reads the data previously stored at the predetermined location on the data disk and XORs the new data and the previously stored data to generate a change pattern. The change pattern is then returned to the RAID controller which determines whether there are any differences between the data at the storage location on the data disk and the new data to be written to the storage location. If there are no differences, no further I/O is required. If there are differences, the RAID controller writes the change pattern to the parity disk controller which then reads the parity value for the previously stored data. The parity disk controller then generates a new parity value by XORing the old parity value and the change pattern. The new data is then written to the data disk by the data disk controller and the new parity value is written to the parity disk by the parity disk controller.

In still another embodiment, when a write request is issued to the RAID controller by the host computer, the RAID controller first writes the data to the data disk controller. The data disk controller then reads the data previously stored at the predetermined location on the data disk and XORs the new data and the previously stored data to generate a change pattern. The data disk controller then determines whether there are any differences between the data at the storage location on the data disk and the new data to be written to the storage location. As before, if there are no differences, no further I/O is required. If there are differences, the appropriate change patterns, along with a change mask, are then returned to the RAID controller to indicate the result of the operation. The change mask indicates which blocks of data have changed in the original write request. For example, consider a change mask for a four block write operation indicated by the values $Cm_1$, $Cm_2$, $Cm_3$ and $Cm_4$. If the change mask=1001, the setting of $Cm_1$ and $Cm_4$ equal to one in the mask indicates that the change patterns returned to the RAID controller correspond to blocks one and four of the write operation. Thus, the change patterns $CP_1$ and $CP_4$ would be the only change information to be sent back to the RAID controller. The parity disk controller reads the parity value for the previously stored data and generates a new parity value by XORing the old parity value and the change pattern. The new data and new parity value are then written to the parity storage media by the data and parity disk controllers, respectively.

In still yet another embodiment, when the RAID controller is instructed by the host computer to write a block of data to a data disk, the RAID controller sends the data to the data disk controller. The data disk controller then calculates the change pattern by XORing the new data with the data that is presently stored at the location on the data disk. The data disk controller also calculates a change mask. If the change pattern is not all zero, the data disk controller then writes the new data to the data disk and sends the change patterns along with the change mask directly to the parity disk controller thus completely eliminating the RAID controller from handling the remainder of the I/O operations.

The XOR operation may be accomplished in hardware, firmware or software with XOR logic. The examination of the result for changes may be performed by a latch whose output is set to zero at a disk block boundary and which is set to 1 and remains 1 once a difference between the block of data previously stored and the new data to be stored has been detected.

DESCRIPTION OF THE DRAWINGS

The above and further advantages of this invention may be better understood by referring to the following description taken in conjunction with the accompanying drawing, in which:

FIG. 5 is yet another embodiment of the presently disclosed method for writing data to disk in a RAID disk subsystem;

DETAILED DESCRIPTION OF THE INVENTION

Figure 1:
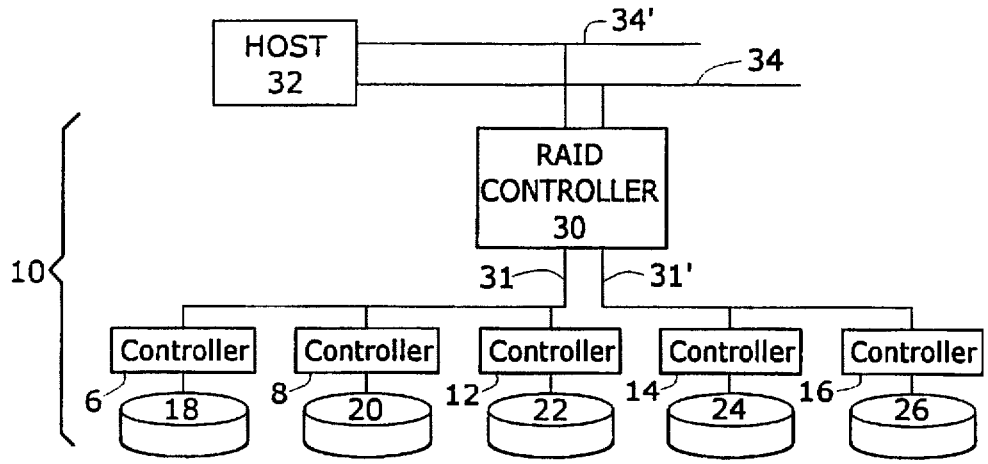
FIG. 1 is an embodiment of a RAID disk subsystem in conjunction with a host computer as known to the prior art.
Figure 2:
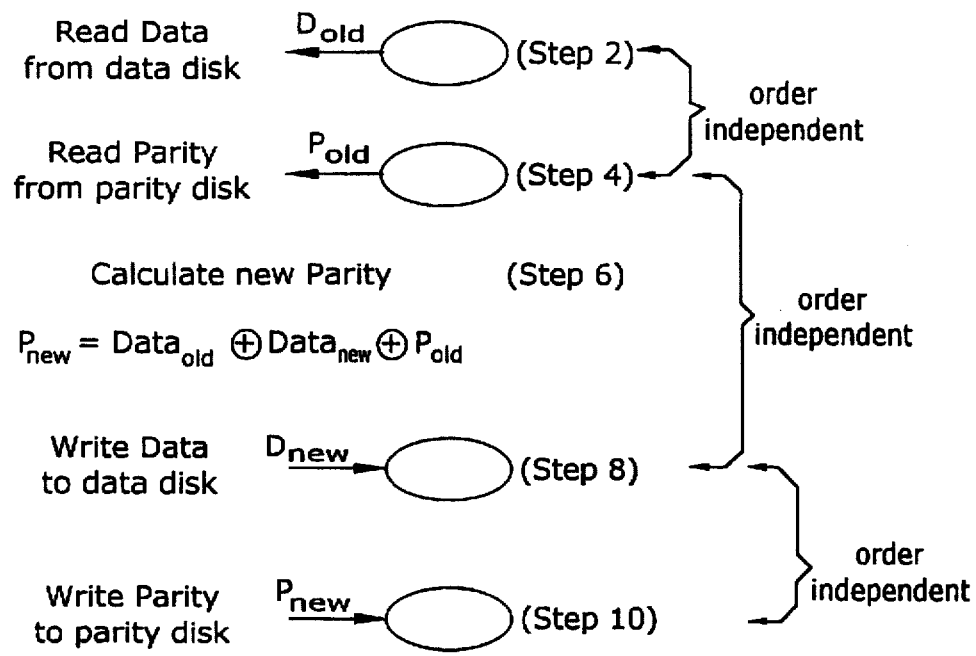
FIG. 2 is an embodiment of a method for writing data to disk in a RAID disk subsystem as known to the prior art.
Figure 3:
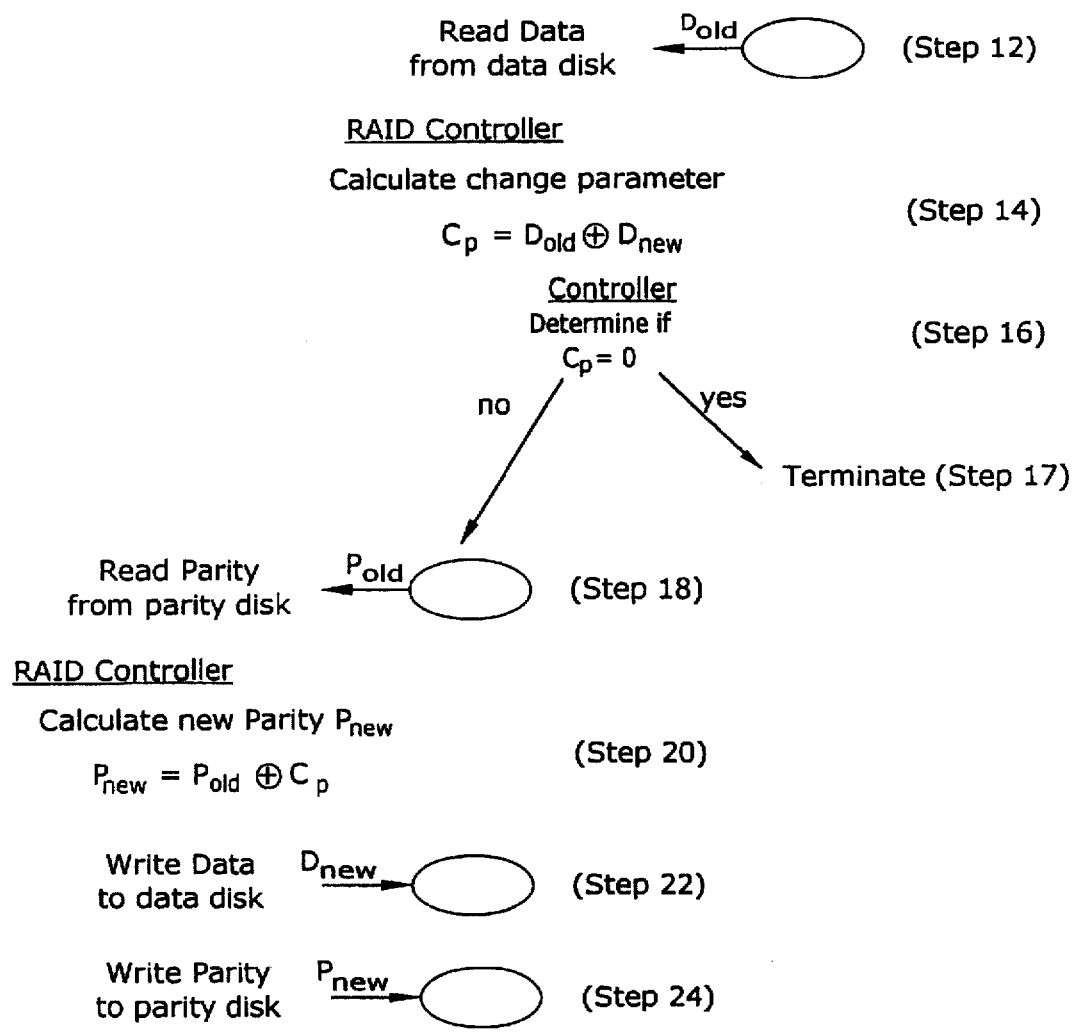
FIG. 3 is an embodiment of the presently disclosed method for writing data to disk in a RAID disk subsystem.

Referring to FIG. 3, when a request to write a block of data to a predetermined location on a data disk, is received by a RAID controller, an I/O disk operation is performed by the RAID controller to read the block of data currently stored in the predetermined location on the data disk (Step 12). The new block of data to be written, $D_{new}$, is then exclusive OR'd (XOR'd) by the RAID controller with the block of data read from the predetermined location on the data disk, $D_{old}$, to generate a change pattern ($C_p$) (Step 14). That is:

$$C_p = D_{new} \oplus D_{old}$$

The XOR operation produces a non-zero result in the change pattern ($C_p$) for each bit location at which the new block of data differs from the previously stored block of data. The change pattern ($C_p$) generated by the XOR operation is then examined to determine whether the new block of data to be written and the block of data currently written on the data disk are the same (Step 16). If the change pattern is all zeros, the new block of data and the previously written block of data are the same and nothing further need be done (Step 17).

If the change pattern ($C_p$) contains at least one non-zero bit, the pattern indicates a difference between the block of data previously stored in the location and the new block of data to be written to that location, so the RAID controller reads the parity corresponding to the previously stored block of data, ($P_{old}$), from the parity disk (Step 18). The parity data for the currently stored data on the parity disk ($P_{old}$) is XOR'd with the change pattern ($C_p$) by the RAID controller to generate the new parity ($P_{new}$) (Step 20). That is:

$$P_{new} = P_{old} \oplus C_p$$

In a third I/O operation, the new block of data ($D_{new}$) is written to the predetermined location on the data disk (Step 22) and a fourth I/O operation writes the parity of the new block of data ($P_{new}$) to the parity disk storing the parity data (Step 24).

Therefore, in the case in which the data to be written is the same as the data stored at the predetermined location on the data disk, only one disk I/O operation need be performed; i.e., a read of the data from the location on the disk to which the new data is to be written. This results in a significant decrease in I/O activity (one I/O operation versus four I/O operations in the prior art) when the new block of data to be written, $D_{new}$, and the block of data currently stored on the data disk, $D_{old}$, are the same.

Figure 4:
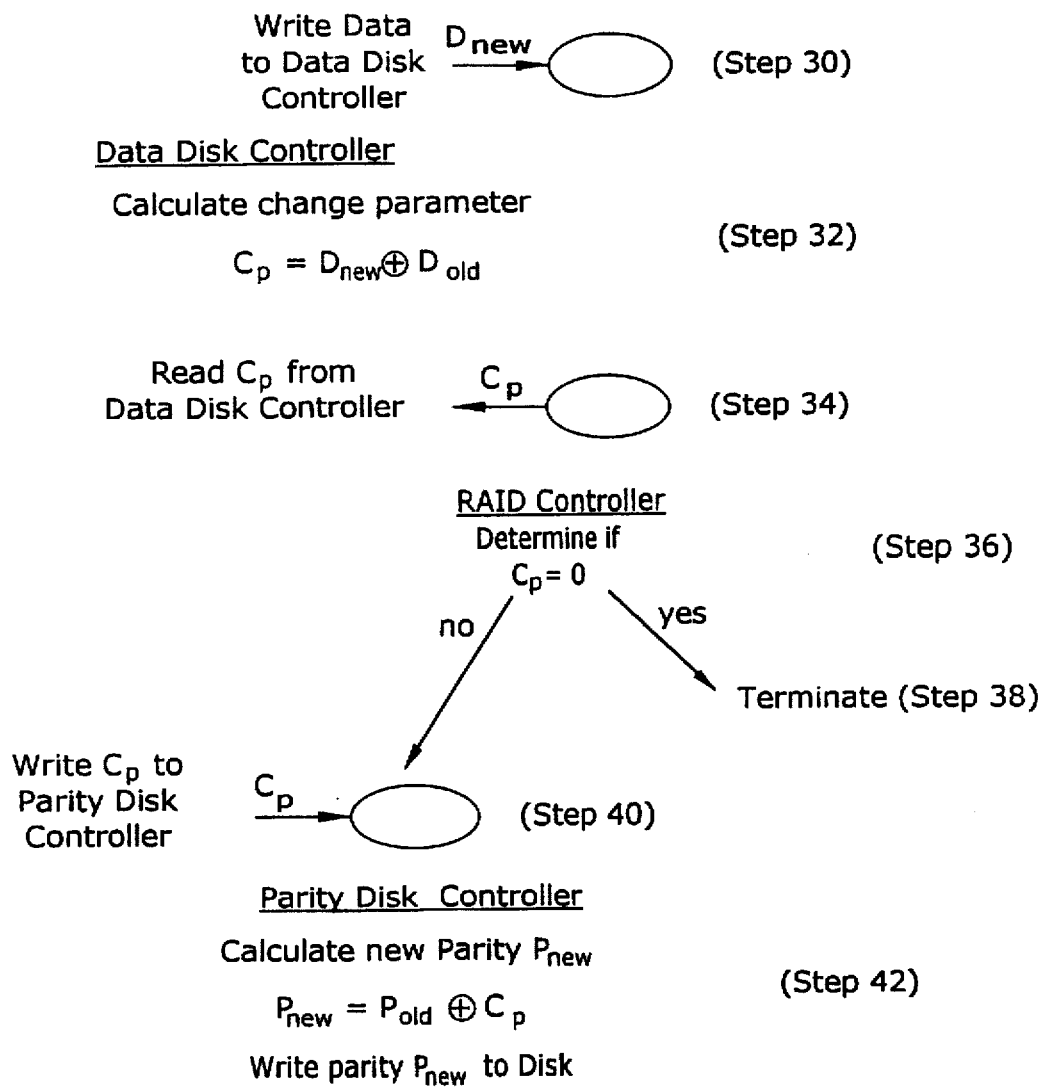
FIG. 4 is another embodiment of the presently disclosed method for writing data to disk in a RAID disk subsystem.

Another embodiment, as depicted in FIG. 4, is possible when the disk controller electronics co-resident with the disk are capable of performing XOR operations under the control of the RAID controller. When the RAID controller is instructed by the host computer to write a block of data, $D_{new}$, to a data disk, the RAID controller sends the data to the data disk controller (Step 30). The data disk controller then calculates the change pattern, $C_p$, by XORing the new data received from the RAID controller, $D_{new}$, with the data that is presently stored at that location on the data disk, $D_{old}$ (Step 32). That is:

$$C_p = D_{old} \oplus D_{new}$$

The RAID controller then reads the change pattern, $C_p$, from the data disk controller (Step 34). The RAID controller then examines the change pattern to determine if the data has changed (Step 36). If the change pattern $C_p$ is equal to 0, indicating that the data at the location on the data disk, $D_{old}$, and the data to be written to the location on the data disk, $D_{new}$, are the same, then no further I/O operations need take place (Step 38).

However, if the change pattern $C_p$ contains at least one non-zero entry, the data disk controller writes the new data, $D_{new}$, to the data disk. The RAID controller then sends $C_p$ to the parity disk thereby instructing the parity disk to calculate a new parity value, $P_{new}$ (Step 40). The parity disk, in response, calculates the new parity value, $P_{new}$, by XORing the old parity value, $P_{old}$, from disk with the change pattern, $C_p$ (Step 42). That is:

$$P_{new} = P_{old} \oplus C_p$$

The parity disk controller then writes the new parity value, $P_{new}$, to parity disk.

Another embodiment, is depicted in FIG. 5, in which the disk controller co-resident with the disk is capable of performing XOR operations and analyzing the result of the XOR operation. When the RAID controller is instructed by the host computer to write a block of data, $D_{new}$, to a data disk, the RAID controller sends the data to the data disk controller (Step 46). The data disk controller then calculates the change pattern, $C_p$, by XORing the new data received from the RAID controller, $D_{new}$, with the data that is presently stored at that location on the data disk, $D_{old}$ (Step 48). That is:

$$C_p = D_{old} \oplus D_{new}$$

If the change pattern, $C_p$, is not all zero, the data disk controller then writes the new data to the data disk. The change pattern, $C_p$, along with the change mask is returned to the RAID controller from the data disk controller (Step 50) and is then transferred to the parity disk controller (Step 52). If the change pattern, $C_p$, is not all zeros, the parity disk controller calculates a new parity value, $P_{new}$, by XORing the old parity value, $P_{old}$, from disk with the change pattern, $C_p$ (Step 54), as before, and then writes the new parity value, $P_{new}$, to the parity disk.

Figure 6:
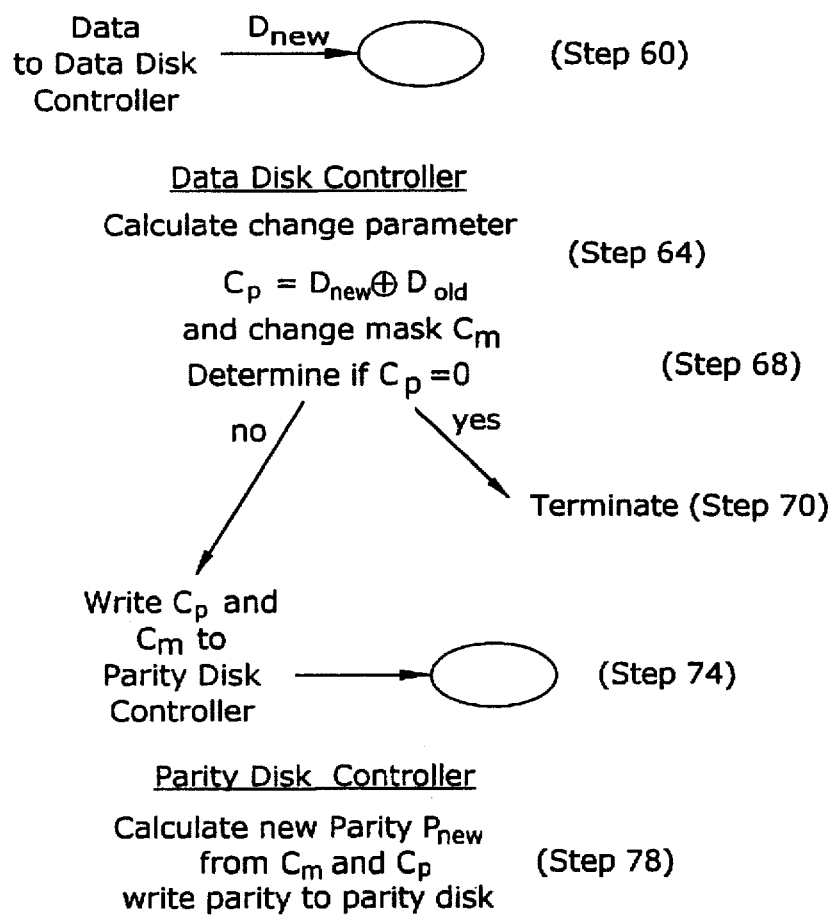
FIG. 6 is still yet another embodiment of the presently disclosed method for writing data to disk in a RAID disk subsystem.

In yet another embodiment shown in FIG. 6, the data disk controller co-resident with the disk are capable of performing XOR operations; analyzing the result of the XOR operations for changes; and communicating with the parity disk controller that contains the parity information corresponding to the data located on the data disk. In this embodiment, when the RAID controller is instructed by the host computer to write a block of data, $D_{new}$, to a data disk, the RAID controller sends the data to the data disk controller (Step 60). The data disk controller then calculates the change pattern, $C_p$, by XORing the new data received by the RAID controller, $D_{new}$, with the data that is presently stored at the location on the data disk, $D_{old}$ and calculates the change mask $Cm$ (Step 68). That is:

$$C_p = D_{old} \oplus D_{new}$$

If the change pattern, $C_p$, is zero, no further I/O operations are needed (Step 70).

However, if the change pattern, $C_p$, is not all zero, the data disk controller then writes the new data to the data disk and sends the change patterns, $C_p$, along with the change mask, $Cm_{1\ldots n}$, directly to the parity disk controller of the parity disk which contains the corresponding parity blocks (Step 74). This method completely eliminates the RAID controller from handling the remainder of the I/O operations. The parity disk controller of the parity disk which contains the parity information then calculates the new parity, $P_{new}$, by reading the old parity, $P_{old}$, and XORing it with the change pattern, $C_p$, that was received from the data disk controller (Step 78). The new parity is then written to the parity disk.

It should be noted that in any embodiment in which the RAID controller transfers the change pattern, $C_p$, to the disk controller to instruct the disk controller to write a new block of data, it is also possible for the RAID controller to use the change mask, $Cm$, to create a skip mask to permit a large number of data blocks to be queued. A skip mask is an n-bit word in which each bit which is set in the word corresponds to a block of new data which is to be written to or read from a disk. That is, a bit in the skip mask is set to 1 if the block of data to which the bit corresponds is to be written to disk and is 0 if the block is not to be written to disk.

Thus, for example, if the data disk controller returns, to the RAID controller, a series of change patterns (for example $C_{p1}$–$C_{p5}$) in which $C_{p1}$, $C_{p2}$, and $C_{p5}$ are non-zero and hence correspond to new blocks of data which are to be written to the disk and in which $C_{p3}$ and $C_{p4}$ are zero and correspond to new data blocks which need not be written to disk, due to the fact that the data has not changed, the RAID controller would then create a skip mask in which the first, second and fifth bits are one. In this example the skip mask which is created would be 11001.

The RAID controller issues a write command to the parity disk controller along with the skip mask and the change parameters $C_{p1}$, $C_{p2}$, and $C_{p5}$. The parity disk controller then uses the skip mask to select the old parity values $P_{old-1}$, $P_{old-2}$, and $P_{old-5}$ which are to be read from the parity disk. The parity disk controller then uses the change parameters $C_{p1}$, $C_{p2}$, and $C_{p5}$ and the old parity values $P_{old-1}$, $P_{old-2}$, and $P_{old-5}$ to calculate the new parity values $P_{new-1}$, $P_{new-2}$, and $P_{new-5}$.

Figure 7:
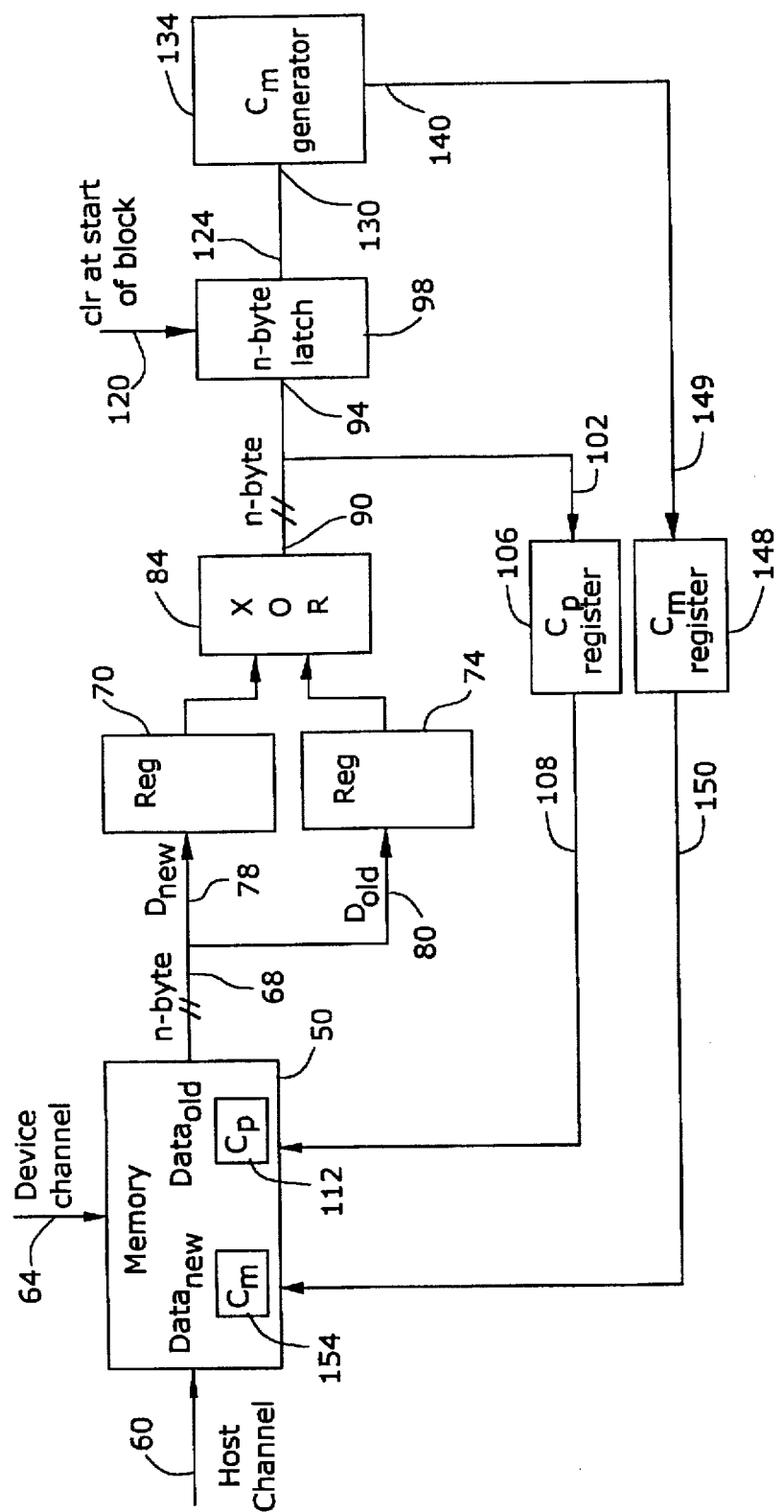
FIG. 7 is a block diagram of an embodiment of a hardware implementation of the apparatus of the invention.

A hardware embodiment of the invention, is shown in FIG. 7. In this embodiment, hardware is used to detect the presence of a non-zero result following the XOR operation. The use of hardware may be more desirable in applications where higher speed is required. The faster speed of calculation available in hardware permits a calculation to be made before the disk has an opportunity to complete a revolution. This lessens the chance that another complete revolution will be missed before the required data location appears beneath the read head of the disk again.

A block of data to be written, $D_{new}$, is received into memory 50 from the host 32 by way of the host channel 60. Likewise the previously written block of data, $D_{old}$, is received into memory 50 from the disk by way of the device channel 64. An n-byte wide bus 68 provides a data path to transfer $D_{new}$ and $D_{old}$ from the memory 50 to registers 70, 74, respectively. The registers 70, 74 in turn provide the input signals 78, 80, respectively to XOR logic 84 which performs the XOR operation.

The output 90 of the XOR logic 84 is both the input 94 to change detection logic 98 and the input 102 to change pattern register 106. Change pattern register 106 holds the results of the XOR operation which are written back into memory.

The change detection logic 98, which in one embodiment is an n-byte latch, is cleared by CLR line 120 at the start of each new block. The output 124 of the change detection logic 98 will therefore remain set even if subsequent zeros are generated by the XOR logic 84 and appear on the input 94 of the change detection logic 98. Such change detection logic 98 can be scaled to any n-bit implementation, including, but not limited to, 8, 16 or 32 bit implementations and implementations in which n is odd.

The output 124 from the change detection logic 98 is the input 130 to change mask generator 134. The change mask generator 134 sets a bit for each block in a group of blocks which must be written. The output 140 is the input to a skip mask register 148 which maintains the skip mask until it is written to a location 154 in memory 50.

Having shown the preferred embodiment, those skilled in the art will realize variations from the disclosed embodiments are possible. Therefore, it is the intention to limit the invention only as indicated by the appended claims.

What is claimed is:

1. A method for writing a new block of data from a disk controller to a predetermined location on a data persistent storage device having a plurality of storage locations, in response to a write request from a host computer, wherein said write request comprises an identification of said predetermined location and said new block of data, said method comprising the steps of:

receiving at said disk controller said request to write said new block of data to said predetermined location on said data persistent storage device;

retrieving a block of data currently stored in said predetermined location on said data persistent storage device;

exclusive ORing (XORing) said retrieved block of data with said new block of data to generate a difference pattern;

determining whether said difference pattern exhibits a predetermined pattern; and terminating writing of said new block of data to said predetermined location on said data persistent storage device if said difference pattern exhibits said predetermined pattern.

2. The method of claim 1 further comprising the steps of:

reading old parity data from a parity persistent storage device containing parity information for said block of data currently stored in said predetermined location on said data persistent storage device;

producing new parity data for said new data block by XORing said old parity data for said block of data currently stored in said predetermined location on said data persistent storage device with said difference pattern;

writing said new data block to said predetermined location on said data persistent storage device; and writing said new parity of said new block of data to said parity persistent storage device.

3. The method of claim 1 wherein said predetermined pattern is all zeros.

4. A method for writing a block of data to a predetermined location on a data persistent storage device, said method comprising the steps of:

transferring, from a host computer to a RAID controller in electrical communication with said host computer, said block of data;

issuing, by said RAID controller to a data persistent storage device controller, a read request to retrieve a block of data previously stored at said predetermined location on said data persistent storage device;

returning, from said data persistent storage device controller to said RAID controller, said block of data previously stored at said predetermined location on said data persistent storage device;

performing in said RAID controller, an exclusive OR (XOR) operation between said block of data previously stored at said predetermined location on said data persistent storage device and said block of data to be written to said data persistent storage device to thereby generate a change pattern;

determining, in said RAID controller, if said change pattern exhibits a predetermined pattern; and if said change pattern does not exhibit said predetermined pattern:

causing, by said RAID controller, said data persistent storage device controller to write said block of data to said predetermined location on said data persistent storage device;

causing, by said RAID controller, a parity persistent storage device controller to read old parity corresponding to said block of data at said predetermined location on said data persistent storage device;

transferring said old parity corresponding to said block of data at said predetermined location on said parity persistent storage device to said RAID controller;

calculating, by said RAID controller, a new parity from said change pattern and said old parity corresponding to said block of data at said predetermined location on said data persistent storage device; and transferring said new parity to said parity persistent storage device controller;

writing said new parity, by said parity persistent storage device controller to said parity persistent storage device; and if said change pattern exhibits said predetermined pattern, terminating, by said RAID controller, I/O operations.

5. The method of claim 4 wherein said predetermined pattern is all zeros.

6. A method for writing a block of data to a predetermined location on a data persistent storage device, said method comprising the steps of:

transferring, from a host computer to a RAID controller in electrical communication with said host computer, said block of data to be written to said predetermined location on said data persistent storage device;

writing, by said RAID controller to a data persistent storage device controller, said block of data to be written to said predetermined location on said data persistent storage device;

reading, by said data persistent storage device controller, data previously stored at said predetermined location on said data persistent storage device;

performing, by said data persistent storage device controller, an XOR operation between said block of data to be written to said predetermined location on said data persistent storage device, and said data previously stored at said predetermined location on said data persistent storage device to generate a change pattern;

writing by said data persistent storage device controller, of said block of data to said predetermined location on said data persistent storage device;

transferring said change pattern to said RAID controller;

determining, by said RAID controller, if said change pattern exhibits a predetermined pattern; and if said change pattern does not exhibit said predetermined pattern:

causing, by said RAID controller, a parity persistent storage device controller to read old parity from a parity persistent storage device, said old parity corresponding to said block of data at said predetermined location on said data persistent storage device;

transferring to said parity persistent storage device controller said change pattern from said RAID controller;

calculating, by said parity persistent storage device controller, a new parity from said change pattern and said old parity corresponding to said block of data at said predetermined location on said data persistent storage device; and writing said new parity, by said parity persistent storage device controller to said parity persistent storage device; and if said change pattern exhibits said predetermined pattern, terminating, by said RAID controller, I/O operations.

7. The method of claim 6 wherein said predetermined pattern is all zeros.

8. A method for writing a block of data to a predetermined location on a data persistent storage device, said method comprising the steps of:

transferring, from a host computer to a RAID controller in electrical communication with said host computer, said block of data to be written to said predetermined location on said data persistent storage device;

writing, by said RAID controller to a data persistent storage device controller associated with said data persistent storage device, said block of data to be written to said predetermined location on said data persistent storage device;

reading, by said data persistent storage device controller, data previously stored at said predetermined location on said data persistent storage device;

performing, by said data persistent storage device controller, an XOR operation between said block of data to be written to said predetermined location on said data persistent storage device, and said data previously stored at said predetermined location on said data persistent storage device to generate a change pattern;

determining, by said data persistent storage device controller, if said change pattern exhibits a predetermined pattern; and if said change pattern does not exhibit said predetermined pattern, writing, by said data persistent storage device controller, said block of data to be written to said predetermined location on said data persistent storage device;

transmitting said change pattern to said RAID controller;

transmitting said change pattern from said RAID controller to a parity persistent storage device controller associated with a parity persistent storage device;

reading, by said parity persistent storage device controller, an old parity value for the previously stored data;

generating, by said parity persistent storage device controller, a new parity value by XORing said old parity value and said change pattern; and writing, by said parity persistent storage device controller, said block of data and said new parity value to said parity persistent storage device; and if said change pattern exhibits said predetermined pattern terminating I/O operations.

9. The apparatus of claim 8 wherein said predetermined pattern is zero.

10. An apparatus for writing a new block of data to a predetermined storage location on a data disk drive having a plurality of storage locations in response to a write request from a host computer, wherein said write request comprises an indication of said predetermined storage location and said new block of data, said apparatus comprising:

a first register having an input and an output, said input of said first register receiving said new block of data to be written to said data disk drive;

a second register having an input and an output, said input of said second register receiving a block of data stored in said predetermined location on said data disk drive;

XOR logic having a first input, a second input and an output, said first input of said XOR logic coupled to said output of said first register and said second input of said XOR logic coupled to said output of said second register, wherein a difference pattern is generated at said output of said XOR logic in response to said new block of data and said stored block of data; and said apparatus being operative to discontinue storing of said new block of data to said predetermined location on said data disk drive if said difference pattern is equal to a predetermined value.

11. The apparatus recited in claim 10 wherein said apparatus is operative to store said new block of data in said data disk drive in the event that said difference pattern does not equal said predetermined value.

12. A method for writing a plurality of blocks of data to predetermined locations on at least one data persistent storage device, said method comprising the steps of:

transferring, from a host computer to a RAID controller in electrical communication with said host computer, said blocks of data to be written to said predetermined locations on said at least one data persistent storage device;

writing, by said RAID controller to at least one data persistent storage device controller, said blocks of data to be written to said predetermined locations on said at least one data persistent storage device;

reading, by said at least one data persistent storage device controller, data previously stored at said predetermined locations on said at least one persistent storage device;

performing, by said at least one data persistent storage device controller, an XOR operation between each of said plurality of said blocks of data to be written to said predetermined locations on said at least one data persistent storage device, and said data previously stored at said predetermined locations on said at least one data persistent storage device to generate a change pattern for each block of data of said plurality of blocks of data;

transferring said change patterns to said RAID controller;

determining, by said RAID controller, if any of said change patterns exhibit a predetermined pattern; and if any of said change patterns do not exhibit said predetermined pattern:

generating, by said RAID controller, a skip pattern corresponding to said change patterns;

causing, by said RAID controller, said at least one data persistent storage device controller to write each said block of data of said plurality of blocks of data to said predetermined locations on said at least one data persistent storage device;

transferring to said at least one parity persistent device controller a skip pattern and each said change pattern not exhibiting said predetermined pattern from said RAID controller;

reading, by said at least one parity persistent storage device controller, old parity corresponding to each said block of data of said plurality of blocks of data from at least one parity persistent storage device;

calculating, by said at least one parity persistent device controller, a new parity from said change pattern, skip pattern and said old parity corresponding to each said block of data of said plurality of said blocks of data; and writing said new parity, by said at least one persistent storage device controller to said at least one parity persistent storage device; and if all said change patterns exhibit said predetermined pattern, terminating, by said RAID controller, I/O operations.

13. The method of claim 12 wherein said predetermined pattern is all zeros.

14. A method for writing a plurality of blocks of data to predetermined locations on at least one data persistent storage device, said method comprising the steps of:

transferring, from a host computer to a RAID controller in electrical communication with said host computer, said blocks of data to be written to said predetermined locations on said at least one data persistent storage device;

writing, by said RAID controller to at least one data persistent storage device controller, said blocks of data to be written to said predetermined locations on said at least one data persistent storage device;

reading, by at least one said data persistent storage device controller, data previously stored at said predetermined locations on said at least one persistent storage device;

performing, by at least one said data persistent storage device controller, an XOR operation between each of said plurality of said blocks of data to be written to said predetermined locations on said at least one data persistent storage device, and said data previously stored at said predetermined locations on said at least one data persistent storage device to generate a change pattern for each block of data of said plurality of blocks of data and to generate a change mask;

determining, by said at least one data persistent storage device controller, if any of said change patterns exhibit a predetermined pattern; and if any of said change patterns do not exhibit said predetermined pattern:

transferring to at least one parity persistent device controller said change mask and each said change pattern not exhibiting said predetermined pattern from said at least one data persistent storage device controller;

reading, by said at least one parity persistent storage device controller, old parity corresponding to each said block of data of said plurality of blocks of data from at least one parity persistent storage device;

calculating, by said at least one parity persistent device controller, a new parity from said change pattern corresponding to each said block of data of said plurality of blocks of data, said change mask and said old parity corresponding to each said block of data of said plurality of said blocks of data; and writing said new parity, by said at least one persistent storage device controller to said at least one parity persistent storage device; and if all said change patterns exhibit said predetermined pattern, terminating I/O operations.

15. The method of claim 14 wherein said predetermined pattern is all zeros.

16. A method for avoiding unnecessary write operations in a disk system comprising at least one disk controller and at least one data persistent storage device having a plurality of storage locations, comprising the steps of:

receiving in said at least one disk controller a write request comprising an indication of a predetermined location on said at least one data persistent storage device and a new block of data intended for writing to said predetermined location on said at least one data persistent storage device, retrieving from said at least one data persistent storage device a block of data currently stored at said predetermined location;

comparing said new block of data to said retrieved block of data to determine if said new block of data is the same as said retrieved block of data;

in the event that said new block of data is the same as said retrieved block of data, terminating writing of said new block of data to said predetermined location on said at least one data persistent storage device.

* * * * *

UNITED STATES PATENT AND TRADEMARK OFFICE
CERTIFICATE OF CORRECTION

PATENT NO. : 5,748,885
DATED : May 5, 1998
INVENTOR(S) : Brian Gallagher

It is certified that error appears in the above-indentified patent and that said Letters Patent is hereby corrected as shown below:

In the Title, line 3, "METHOD AND APPARATUS FOR REDUCTION OF I/O OPERATIONS IN PERSISTENT STORAGE SYSTEM" should read --METHOD AND APPARATUS FOR REDUCTION OF I/O OPERATIONS IN A PERSISTENT STORAGE SYSTEM--.

Column 1, line 3, "METHOD AND APPARATUS FOR REDUCTION OF I/O OPERATIONS IN PERSISTENT STORAGE SYSTEM" should read --METHOD AND APPARATUS FOR REDUCTION OF I/O OPERATIONS IN A PERSISTENT STORAGE SYSTEM--.

Signed and Sealed this

Second Day of November, 1999

Q. TODD DICKINSON

*Attest:*

*Attesting Officer*   Acting Commissioner of Patents and Trademarks